United States Patent [19]

DeLucia et al.

[11] Patent Number: 4,864,569
[45] Date of Patent: Sep. 5, 1989

[54] SOFTWARE VERIFICATION AND VALIDATION CONFIGURATION MANAGEMENT SYSTEM

[75] Inventors: R. Ralph DeLucia, Valencia; David W. Rockot, North Huntingdon; Daniel J. Wolf; Neil J. Musicante, both of Pittsburgh; Thomas A. Pike, Murrysville, all of Pa.

[73] Assignee: Westinghouse Electric Corp., Pittsburgh, Pa.

[21] Appl. No.: 125,294

[22] Filed: Nov. 25, 1987

[51] Int. Cl.$^4$ ............................................. G06F 11/00
[52] U.S. Cl. ...................................................... 371/19
[58] Field of Search .................................. 371/19, 67; 364/200 MS File, 900 MS File, 300

[56] References Cited

U.S. PATENT DOCUMENTS

| | | | |
|---|---|---|---|
| 4,118,789 | 10/1978 | Casto | 371/19 X |
| 4,558,413 | 12/1985 | Schmidt | 364/200 X |
| 4,696,003 | 9/1987 | Kerr | 371/19 |
| 4,714,992 | 12/1987 | Gladney | 364/200 |
| 4,742,467 | 5/1988 | Messerich | 371/19 X |

FOREIGN PATENT DOCUMENTS 1149268 4/1985 U.S.S.R. .

Primary Examiner—Jerry Smith
Assistant Examiner—Robert W. Beausoliel
Attorney, Agent, or Firm—D. C. Abeles

[57] ABSTRACT

Differences between both the code and documentation of a revised generation of software and a previous generation are compared by a digital computer with the intended revisions stored in a release file. When all discrepancies have been eliminated, and for the original generation of the software, actual impacts in the form of the locations in the program where one routine is called by another and where common statements and public variables are used, are compared with expected impacts stored in the release file. When all actual impacts have been identified, the revised software, or the original version in the case of newly created software, is stored in a library with the code and documentation paired, and with each revision of each unit identified for later retrieval and reconstruction of any software generation. The latest generation of the software is then simultaneously verified, preferably by an automated process in a programmed computer, and validated through testing of the auto-linked program in PROMs inserted in the actual hardware.

13 Claims, 2 Drawing Sheets ns in such a power plant

SOFTWARE VERIFICATION AND VALIDATION CONFIGURATION MANAGEMENT SYSTEM

BACKGROUND OF THE INVENTION

1. Field of the Invention

This invention relates to a programmed computer system and process which monitors, evaluates, and documents revisions to computer code.

2. Background Information

The complexity of large software systems makes it very difficult to assure that the system performs in accordance with specifications. In addition, it is often difficult to determine all the effects that revisions to a portion of the code will have throughout the system. Furthermore, it is important to document all revisions so that the state of the system can be accurately determined. While such proving and documentation of the software are important in any large software system, they are particularly important in large computer controlled process control systems, and most especially, in safety-related systems of a nuclear power plant.

Many processes in a power plant are monitored in the plant main control room using signals sent from instrumentation located throughout the plant. Although many operations in the control room are manual the remaining majority are automatically performed through circuitry involving programmed microprocessors. The programs used often control safety-related systems and are critical to safe plant operation. Consequently, their accuracy and integrity are important.

Generally these programs are complex and contain a great deal of branching and retrieval of subroutines. During the development of these programs, it is not unusual to revise a portion of the program. A revision in one portion of the program may critically affect another portion of the same program, or impact the operation of one or more other programs in the software system, and therefore with each revision the entire software system must be re-examined for integrity. Because of the complexity of such software systems, this becomes a major task that is very time consuming and prone to error.

Typically, the software is produced by a design team which generates code to perform specified functions. The code is verified and validated by a separate team. Verification is the checking of the individual pieces of software to assure that they meet the software design specifications and supporting documentation. This has been carried out by devising tests which exercise the various loops in a piece of software. For very complex programs it can be difficult to assure that all possible paths in the program have been tested. Commonly assigned patent application Ser. No. 35,802 (now U.S. Pat. No. 4,819,233) filed on Apr. 8, 1987 entitled Verification of Computer Software discloses a machine implemented method and system for verifying software which automatically tests all possible branching within a piece of software. This form of verification is carried out using a general purpose digital computer.

Validation involves analyzing overall system performance to assure that it satisfies preestablished functional requirements. Validation tests are carried out with production software in the actual hardware to assure that the actual system will meet the functional requirements.

In addition to the verification and validation requirements, government regulations require strict and detailed documentation for all programs that control safety-related systems in a nuclear power plant. Typically, there are about 1200 programs in such a power plant and this task of testing and documentation becomes formidable. Hence there remains a need for a system and method to analyze and document computer program revisions, identify affected portions of the program, and confirm that the impact of any revision has been addressed to insure that the integrity of the software system is maintained.

SUMMARY OF THE INVENTION

These needs are met by the present invention in which software, including code and documentation, created or revised by a design team is stored in a software file, and identification of revisions to re-released code is stored in a release file. A programmed digital computer first compares the revised software with a previous generation of the software stored in a software library and identifies any discrepancies between actual differences detected between the revised and earlier generations of the software and the revisions identified in the release file. Any such discrepancies are referred back to the design team for correction.

Original software and revised software in which all revisions have been identified in the release file are then compiled. Successful compilation indicates compatible routines. Again any discrepancies are eliminated by revision of the software.

As another aspect of the invention, a programmed digital computer is operated to identify all impacts on related software due to a change in a specific piece of software. Typically, these include: (1) call interfaces to other subroutines, (2) common statements, and (3) publicly declared variables. The computer compares these actual impacts with impacts identified in the release file, again with any discrepancies identified for correction. When all impacts are anticipated by the release file, the software is properly released.

The released version of the software is archived in a software library where each piece of code and its documentation are paired and where the identification of each generation of software is maintained.

Once the latest generation of the code has been archived, verification and validation are carried out simultaneously. Verification may be carried out in a general purpose digital computer by a software system which automatically instruments the code unit by unit, carries out tests to exercise each branch of the code unit, and provides documentary results of the tests. Validation includes auto-linking the current generation of the program retrieved from the software library and burning it into programmable memories (PROMs) for use in running the code in the target hardware to determine that it meets the desired functional requirements. Any design problems detected during verification and validation, lead to revised software which must, once again pass through the entire system.

Use of the invention leads to verification and validation of complex software systems with greater confidence and in less time.

BRIEF DESCRIPTION OF THE DRAWINGS

A full understanding of the invention can be gained from the following description of the preferred embodiments when read in conjunction with the accompanying drawings in which FIGS. 1a and 1b when placed end to end illustrate a flow chart of a system incorporating the invention. For clarity, some of the flow paths have not been shown fully, however, such connections are indicated by the letter tags. Data flow to and from the software library is symbolized in the drawings by circles on the connecting lines.

DESCRIPTION OF THE PREFERRED EMBODIMENT

The present invention has been developed specifically for automated verification and validation of the large number of programs used in safety-related systems for nuclear power plants. However, it will be realized by those skilled in the art that the invention has application to the programs and accompanying documentation for all types of software systems.

Although most programs have associated documentation, few have documentation stored with the program code. The exemplary embodiment of the invention is designed so that the program code and program documentation are not only stored together, but are also tested and inspected together.

Programmers from a design team are responsible for preparing and/or modifying programs, including code and documentation, and for preparing software release forms indicating any modifications. Testers from a verification and validation team receive the code, documentation and software release form, and test the code to verify conformance with the software release forms and documentation. For security purposes, the programmers and testers are different individuals.

Figure 1A:
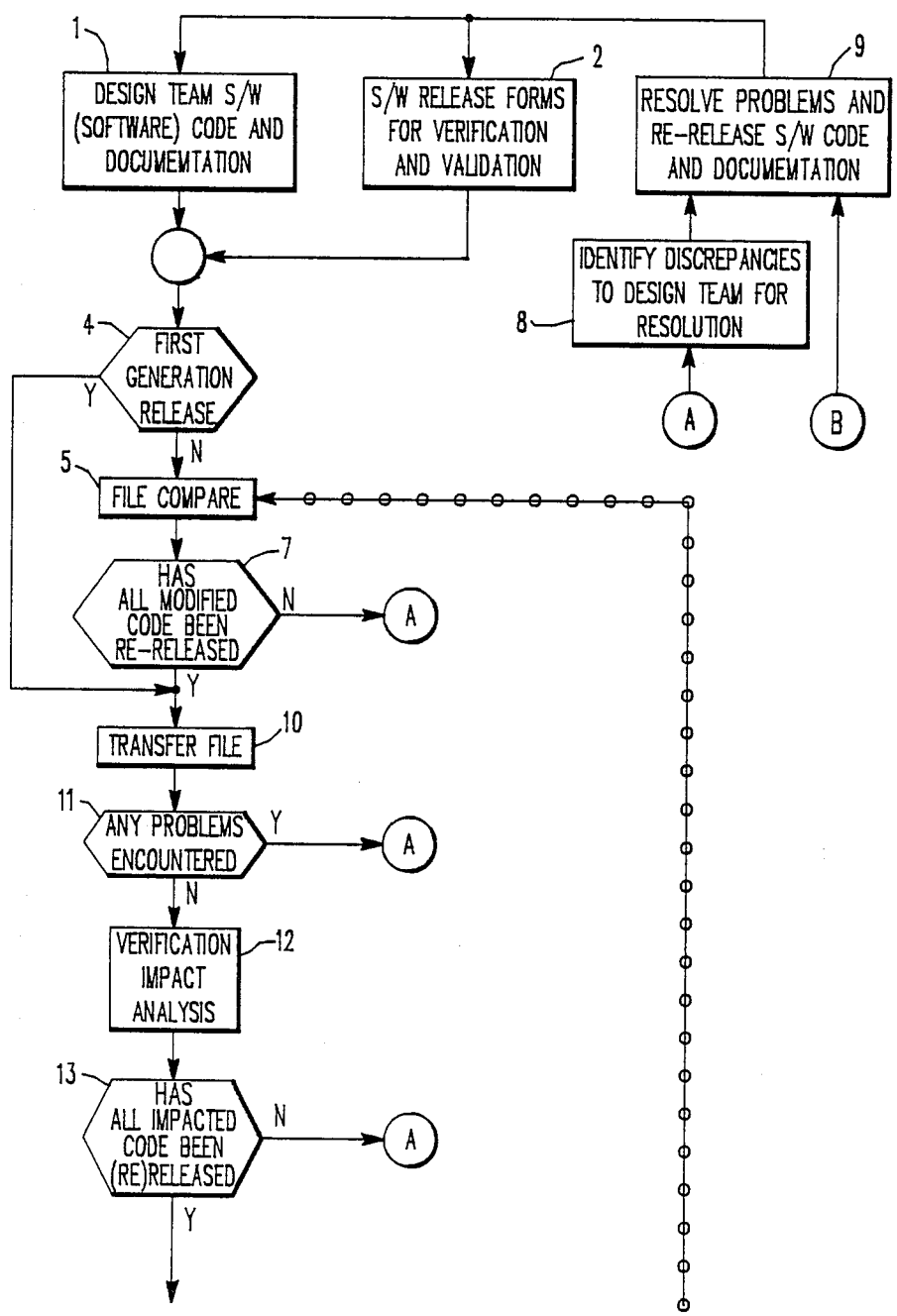
Figure 1B:
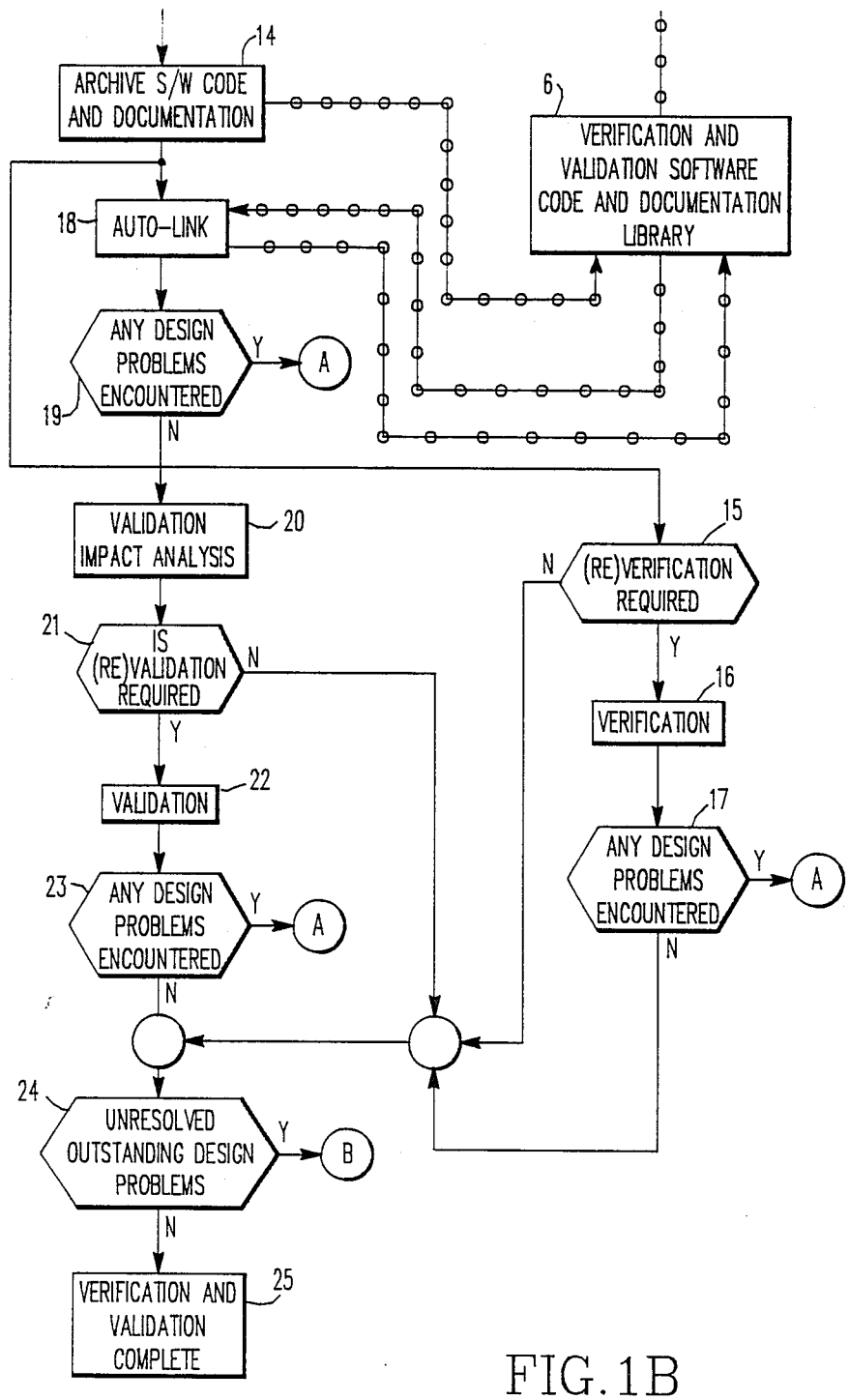

A flow chart of the system is shown in the FIGS. 1a and 1b. A design team generates a program from software specifications as indicated at 1. A typical computer program, upon creation, will have files with both software code and software documentation. Invariably these programs will contain routines which are called by other routines or common statements used in more than one routine. They will also include public variables which are used in multiple locations within the program or even within a particular routine. In addition to preparing an initial program, the design team also prepares modifications or revisions to the code and/or documentation as required. Some programs or routines may be revised many times while others may not be revised at all. However, revision of one routine may have an impact on multiple routines such as where one program calls another or public variables are used. In addition, modifications to the code can have an affect on the documentation and vice versa. For instance if the limits of a variable are changed both the code and the documentation will have to be revised.

In addition to creating and revising the code and documentation, the design team generates software release forms 2. In the case of a newly created software system, the release forms indicate the areas where routines impact one another, such as by one routine calling another routine, and the routines affected by public variables or a common statement. When revisions have been made, the release forms detail each of the changes and again the routines, common statements and variables which they impact. These software release forms coupled with the program code and documentation must be provided before any verification and validation may occur. In accordance with the invention, the release information is provided in the form of computer files for automatic processing.

The original software, or in a case of modifications, the revised software and documentation, are provided in the form of software files together with the release file. A general purpose digital computer accepts these files and first determines whether this is a first generation release at 4. If not, in other words a modification or revision has been made, a line by line comparison is made at 5 between the current generation of the software system and a previous generation stored in a library 6. Any deviations between the two generations of the software code or documentation are determined and examined against the software release forms stored in the release file to confirm that these changes have been identified. If all detected program deviations have been identified in the software release file, then the program has been properly re-released 7. If not, then those deviations not addressed must be identified to the design team for resolution as at 8.

The design team resolves the problems at 9 and releases the software code and documentation by modifying the code and/or documentation 1, and appropriately revising the release file at 2. The re-released program code and documentation are then again compared with the previous generation at 5 and the differences are compared with the modification as indicated in the release file at 7.

When all of the modified code and documentation have been identified in the release file, and initially for the first generation of the software system, a transfer file 10 is utilized which attempts to compile the program code and, if successful, transfers the program from the design team to the verification and validation team domain. Successful compilation is an indication that a compatible set of code is being released (re-released) by the programmers. If any problems are encountered 11 the discrepancies are again identified to the design team at 8 for resolution 9.

Once the program has been compiled, it is processed by a verification impact routine 12 which performs a detailed analysis to determine the location where one routine is called by another, or common statements or public variables are used. In the case of re-released software, this routine determines what other areas of the program will be impacted by the modification in a similar manner. An example would be a common utility routine which is modified in such a way that it now requires an extra parameter, i.e., argument, being passed to it when it is invoked. This would require a change in each and every other routine that utilizes this common routine to pass the extra required argument. Consequently, each of these routines would be re-released as well as the specific utility routine itself. If the software release file 2 anticipates and addresses all of these impacted areas, then the code is properly released or re-released 12. Otherwise, the discrepancies must be identified to the programmer 8 and resolved 9.

Once the verification impact analysis 12 has been performed, and appears to have no problems 13, this new or first generation of the program is archived 14 in the verification and validation library 6. Archiving newly released, or re-released code, within the verification and validation library pairs each piece of code with its documentation.

At this point, with the newly released, or re-released, code and documentation archived within the verification and validation library 6, the software release process has been completed and the verification process and the validation process may now proceed in parallel.

As discussed earlier, verification is the piece wise testing of each piece of code to insure that the code operates exactly as the documentation dictates. This testing can be performed in an environment other than the target hardware. In fact, in the exemplary system, the test program is run on a large scale computer system which emulates execution of the code.

The initial inquiry at 15 is whether verification or re-verification is required. Verification is required, of course, for the initial program to insure that it performs in accordance with specifications. Re-verification is dictated by the results of the verification impact analysis at 12 which identifies all software which has changed. If verification is required, each unit of the software to be verified is examined in detail. Such an analysis can be carried out for instance by the automated system disclosed in commonly owned U.S. patent application Ser. No. 35,802 (U.S. Pat. No. 4,819,233) filed on Apr. 8, 1987 and entitled Verification of Computer Software. With this system a computer program is verified, unit by unit, by automatically instrumenting the code and generating a test driver program which executes all branches of the instrumented code unit. The test driver program implements a series of test cases. Results of the test cases are printed out indicating the sequence of the execution of the various branches in the program unit generated by each test case, together with the expected output values and the actual output values. Where the target code unit called another routine, output documentation indicates that the called statement was reached, and whether the program returns to the correct location after the call.

If any design problems are encountered during verification 17, they are identified to the design team 8 for resolution 9. Once verification, or re-verification, for the program is either performed without any problems being encountered or is bypassed, program flow transfers to 24 which is a common point for termination of the verification and validation processes. Step 24 determines if all currently outstanding verification and validation problems have been resolved. If so, verification and validation is complete. If not, another software release cycle must occur in order to clear outstanding verification and validation problems as indicated at 9.

Simultaneously with verification, the code is permanently burned into PROMS (programmable read only memory chips) and loaded into hardware for use in the power plant. Code for generating the PROMS is processed by a routine called AUTO-LINK 18 which takes the latest generation of code from the library 6 and compiles, links, and locates this most current code into an executable load module from which the PROM is programmed. If any problems are encountered 19, they are identified 8 and resolved 9. An exact copy of the executable load module which was burned into the PROM is returned to the library 6 along with an audit listing of the generation of each and every piece of code utilized to create the load module. This audit listing provides the capability of recreating all previous load modules at a later date.

At this point, the current code from the verification and validation library 6, which has been burned into the PROMS as an executable load module for validation testing, is utilized as a basis for a validation impact analysis 20 to determine which validation tests must be run. In the case of re-released programs, a determination is made as to which validation test, if any, must be release. It is also possible that validation tests which had failed previously are being addressed by this program re-release, in which case, the test will have to be re-executed to insure that all outstanding problems have been properly resolved. If the validation impact analysis warrants any test being run, or rerun, 21, then validation 22 is performed. Otherwise, validation is bypassed and the program flow proceeds to 24. As mentioned earlier, validation is the testing of the total software system in the actual hardware by instrumenting the input and monitoring the output to insure that the system functional requirements are satisfied. Any design problem encountered 23 must be identified 8 and resolved 9.

At this point the program has been through the verification process and the validation process. If any outstanding design problems exist 24, they must be resolved 9. If all problems are resolved, the program is considered verified and validated 25 and the PROM generated from AUTO-LINK 18 may be utilized in the appropriate hardware.

Typically, in the development of a software system, hundreds if not thousands of programs each with numerous generations will exist. The software library 6 of the present invention will contain the program code, documentation, and software release files for all of the generations created. This results in the availability of a complete program development history.

As can be appreciated from the above, the invention provides a software verification and validation system in which program code and corresponding documentation are archived as a single logical entity. In addition, the system insures that all modified and impacted code and documentation resulting from design team code and/or documentation changes are detected by the automated release process and impact analysis, and are identified on the software release forms. The system also provides a framework within which verification and validation can proceed in parallel. Up to now, verification had to be completed before validation could proceed. Finally, the system provides the capability of recreating a prior version of the total software system at a later date, and provides a comprehensive audit trail on all phases of the verification and validation process.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An automated method of releasing software which includes multiple routines at least some of which selectively call others of said routines, share public variables and share common statements, said method comprising steps of:

storing said software in a software file;

generating a release file identifying impact locations where a routine is used by another routine and where public variables and common statements are used; and operating a programmed digital computer to:
identify actual locations in said software stored in said software file where a routine is used by another routine and where any public variables and common statements are used; and
compare said identified actual locations with said identified impact locations and generate an output indicating any discrepancies therebetween.

2. The method of claim 1 wherein operating said digital computer includes, when there are no discrepancies, archiving said software in a software library.

3. The method of claim 2 including modifying said software and storing said modified software in said software file as a revision to said software and wherein generating said release file includes identifying the locations in said software of said modifications and wherein said step of operating said programmed digital computer includes first comparing said modified software in said software file with said archived software and identifying each difference therebetween, and comparing the location of said differences with said release file and generating an output when the differences do not correspond to said modifications identified in said release file.

4. The method of claim 3 wherein said archiving includes identifying in said software library the revisions of the software routines for each generation of the software.

5. The method of claim 2 including linking said software stored in said software library and then simultaneously verifying and validating said linked software.

6. The method of claim 5 including identifying discrepancies in said verifying and validation steps, and modifying said software by correcting said discrepancies.

7. The method of claim 6 wherein archiving includes identifying in said software library said documentation with each piece of code.

8. The method of claim 2 wherein said software includes code and documentation and wherein said step of storing said software in the software file includes storing said code and said documentation, wherein archiving includes archiving said code and documentation wherein generating said release file includes identifying changes in code and in documentation and wherein said programmed digital computer compares the archived code and documentation with the modified code and documentation and identifies differences between each.

9. A method of assuring the integrity of software which has been revised comprising:

storing a first generation of said software including code and documentation of the code in a software library;

generating a software file containing a revised generation of said code and documentation;

generating a release file identifying each of the revisions to said first generation of code and documentation included in said revised generation of said code and documentation; and operating a digital computer to:

compare the revised generation of said code and documentation in said software file with the first generation of code and documentation in said software library and identify each of the differences therebetween;

compare said differences with the revisions contained in said release file; and identify discrepancies therebetween.

10. The method of claim 9 including, when there are no discrepancies, compiling said revised code and documentation.

11. The method of claim 10 wherein generating said release file includes identifying impact locations in said revised generation of code and documentation where a routine is used by another routine and wherein public variables and common statements are used, and wherein said programmed digital computer is operated to identify the actual location in said revised generation of software code where a routine is used by another routine and where any public variables and common statements are used, and to compare said identified actual locations with said identified impact locations and generate an output indicating any discrepancies therebetween.

12. The method of claim 11 including, when there are no discrepancies, operating said programmed digital computer to link the routines of said revised generation of code and documentation.

13. The method of claim 12 including simultaneously verifying and validating the revised generation of code and documentation.

* * * * *